United States Patent [19]

Mignani et al.

[11] Patent Number: 5,116,791
[45] Date of Patent: May 26, 1992

[54] COMPOSITE BORON NITRIDE/SILICON CERAMIC MATERIALS

[75] Inventors: Gerard Mignani, Lyons; Jean-Jacques Lebrun, Caluire, both of France

[73] Assignee: Rhone-Poulenc Chimie, Courbevoie, France

[21] Appl. No.: 740,416

[22] Filed: Aug. 5, 1991

Related U.S. Application Data

[62] Division of Ser. No. 243,827, Sep. 12, 1988, Pat. No. 5,068,164.

[30] Foreign Application Priority Data

Sep. 11, 1987 [FR] France ............... 87 12588

[51] Int. Cl.$^5$ ................ C04B 35/46; C04B 35/48
[52] U.S. Cl. ........................... 501/96; 501/94; 501/92; 501/133; 501/154; 528/4; 528/5; 525/50
[58] Field of Search ............. 501/53, 55, 65, 77, 501/94, 96, 97, 133, 154, 92; 528/4, 5; 525/50

[56] References Cited

U.S. PATENT DOCUMENTS

| | | | |
|---|---|---|---|
| 2,834,650 | 5/1985 | Conant et al. | 23/191 |
| 4,096,297 | 6/1978 | Pappis et al. | 427/248 C |
| 4,107,276 | 8/1978 | Schwetz et al. | 423/290 |
| 4,440,828 | 4/1984 | Resneau et al. | 428/334 |
| 4,495,123 | 1/1985 | Hunold et al. | 264/69 |
| 4,565,747 | 1/1986 | Nakae et al. | 428/698 |
| 4,581,468 | 4/1986 | Paciorek et al. | 556/403 |
| 4,634,640 | 1/1987 | Hunold et al. | 428/704 |
| 4,731,302 | 3/1988 | Weissmantel et al. | 428/698 |
| 4,731,303 | 3/1988 | Hirano et al. | 428/700 |
| 4,767,728 | 8/1988 | Riccitiello et al. | 501/91 |
| 4,772,304 | 9/1988 | Nakae et al. | 65/18.2 |
| 4,784,978 | 11/1988 | Ogasawara et al. | 501/96 |
| 4,853,196 | 8/1989 | Koshida et al. | 423/290 |
| 4,885,264 | 12/1989 | Sindlhauser et al. | 501/87 |
| 4,939,222 | 7/1990 | Mignani et al. | 528/5 |
| 5,015,607 | 5/1991 | Ardaud et al. | 501/96 |

FOREIGN PATENT DOCUMENTS 2163761 3/1986 United Kingdom .

OTHER PUBLICATIONS

Chemical Abstracts, vol. 72; 1970; 132838a.
Chemical Abstracts, vol. 80; 1974; 107481m.
Chemical Abstracts, vol. 80; 1974; 140728v.
Chemical Abstracts, vol. 85; 1976; 143168b.

*Primary Examiner*—William R. Dixon, Jr.
*Assistant Examiner*—Michael A. Marcheschi
*Attorney, Agent, or Firm*—Burns, Doane, Swecker & Mathis

[57] ABSTRACT

Novel composite ceramic materials include a boron nitride matrix and an amount of silicon components compatible therewith; such ceramic materials comprise a core volume having an external sheath layer on an outer face surface thereof, with the majority of said silicon values being distributed throughout the external layer.

13 Claims, No Drawings

COMPOSITE BORON NITRIDE/SILICON CERAMIC MATERIALS

This application is a divisional of application Ser. No. 07/243,827, filed Sep. 12, 1988, U.S. Pat. No. 5,068,164.

CROSS-REFERENCE TO COMPANION APPLICATIONS

Our copending applications, Ser. No. 07/242,907 now U.S. Pat. No. 4,939,222 and Ser. No. 07/643,692, both filed concurrently herewith and both assigned to the assignee hereof.

BACKGROUND OF THE INVENTION

1. Field of the Invention

The present invention relates to novel ceramic compositions based on boron nitride and to a process for the preparation thereof.

This invention also relates to novel composite ceramic materials, and articles shaped therefrom, comprising said boron nitride compositions.

2. Description of the Prior Art

Boron nitride is increasingly in demand in this art in light of its high thermal stability, its resistance to thermal shock, its great chemical inertness and its very good thermal conductivity. On the other hand, its low electrical conductivity makes it an insulator of choice.

Several processes are presently known to the art for the preparation of boron nitride.

One such process includes reacting boron trichloride with ammonia in the gaseous state. A fine boron nitride powder is obtained in this manner, which may be sintered to produce solid shaped articles.

More recently, it was discovered that boron nitride could be produced by the pyrolysis of precursor polymers.

The advantage of this "polymer" method primarily resides in the form of the final product, and, more particularly, enables the production, after pyrolysis, of boron nitride fibers.

The problem is that the boron nitride produced by one or the other of the above processes does not always have those properties which are adequate for certain specific applications.

Thus, more precisely, in the case of the manufacture of composite ceramic products based on boron nitride and silicon compounds, it is desirable to employ a boron nitride based material that is highly compatible with said silicon compounds, such as to enable the production of composites having improved properties.

SUMMARY OF THE INVENTION

Accordingly, a major object of the present invention is the provision of an improved ceramic material based on boron nitride that is highly compatible with the silicon component thereof.

Another object of this invention is the provision of a simple, efficient, economical and readily applicable process for the production of ceramic shaped articles based on boron nitride in a wide variety of useful forms (wires, fibers, molded shaped articles, coatings, foils, films, and the like).

Briefly, the present invention features a novel ceramic shaped article based essentially on boron nitride, and wherein the majority of the silicon atoms contained therein are distributed within an external layer of said shaped article

DETAILED DESCRIPTION OF THE PREFERRED EMBODIMENTS OF THE INVENTION

More particularly according to the present invention, the subject ceramic shaped articles may assume any one of a number of different forms, especially grains, particles, fibers or any other shape.

By "external layer" is intended an outer thickness of material, measured from the outer face surface of the shaped article and extending therein, on the order of several hundreds of angstroms.

By "core volume" is intended the portion of the ceramic material other than the external sheath layer.

By "the majority of the silicon atoms" being distributed in the external layer is intended to connote that more than 50% of the silicon atoms are present in said external layer.

The shaped article according to the invention also has at least one of the following characteristics:

(i) the boron nitride is substantially in the hexagonal crystalline form;

(ii) the percentage, by weight, of the silicon atoms present in the ceramic material does not exceed 10%;

(iii) at least 80% of the silicon atoms present in the ceramic shaped article are present in an external layer thereof having a thickness of 200 Å;

(iv) the silicon atoms are present in the form of silicon compounds, in particular in the form of silicon oxynitride; and (v) said silicon oxynitride has the general formula $Si_2N_2O$.

Furthermore, the ceramic material according to the invention has a high degree of purity. In effect, it contains only trace amounts of $B_2O_3$ (less than 2 molar %) and of carbon (less than 2 molar %); these two compounds are typically detrimental to the quality of ceramic articles shaped from boron nitride.

By virtue of its composition, the ceramic material according to the invention thus has a very high compatibility with the silicon component of ceramics, such as, for example, silicon nitride, silicon carbide, silicon oxynitride, silicon and aluminum oxynitride, silicon boride and silica, this being due to an improved BN/Si interface.

A process for the preparation of the ceramic material according to the invention will now be described.

According to this process, an organometallic precursor is pyrolyzed under an ammonia atmosphere and at a temperature of from 1,000° to 2,000° C., said precursor itself being prepared by reacting (a) a mixture containing a trihalogenoborane (compound A) and a boron compound of the Formula I (compound B):

(I)

wherein X represents a halogen atom and $R^1$ and $R^2$, which may be identical or different, are each a silyl radical, with (b) a compound containing at least one $NH_2$ group (compound C).

The starting compound A advantageously used for the preparation of the precursor is trichloroborane, although other halogenoboranes are also suitable, such as, for example, a trifluoro-, a tribromo- or a triiodoborane.

The starting compound B is advantageously also a chlorine compound.

The silyl radicals $R^1$ and $R^2$ are preferably of the type:

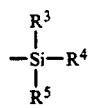

wherein the radicals $R^3$, $R^4$ and $R^5$, which may be identical or different, are each a hydrogen atom or a hydrocarbyl radical.

The hydrocarbyl radicals are advantageously alkyl, cycloalkyl, aryl, alkylaryl or arylalkyl radicals, as well as alkenyl or alkynyl radicals.

Representative such alkyl radicals include the methyl, ethyl, propyl, butyl, pentyl, hexyl, heptyl and octyl radicals. Representative cycloalkyl radicals include the cyclopentyl, cyclohexyl and cycloheptyl radicals. Exemplary aryl radicals are the phenyl and naphthyl radicals, and exemplary alkylaryl radicals are the tolyl and xyxyl radicals. Representative arylalkyl radicals are the benzyl and phenylethyl radicals.

Illustrative of the alkenyl radicals are the vinyl, allyl, butenyl and pentenyl radicals, and illustrative alkynyl radicals are the ethynyl, propynyl and butylyl radicals.

In a preferred embodiment of the invention, the $R^1$ and $R^2$ radicals of compound B are (trialkyl)silyl radicals. (Trimethyl)silyl radicals are especially preferred.

All of the compounds of Formula (I) are well known to this art and may be prepared by any method itself known to the art.

For example, in the case of $R^1$ and $R^2$ radicals of the triorganosilyl type, see Jenne and Niedenzu (*Inorganic Chemistry*, 3, 68 (1964)), Sujishnii and Witz (*Journal of the American Ceramic Society*, 79, page 2447 (1957)), or Wannagat (*Angew. Chemie, International Edition*, 3, page 633 (1964)).

In general, the compound B may be prepared by the action of $BCl_3$ on $LiNR^1R^2$ under suitable conditions of temperature and molar ratio.

Finally, concerning the compounds C (generally designated as the aminolysis reagents) according to the invention for the preparation of the precursor, ammonia, the primary amines, the diamines (hydrazine, alkylhydrazine, hydrazide, alkylenediamines, etc.), the amides, the silylamines, and the like, are exemplary.

However, preferably the compounds having the following Formula (II) are used:

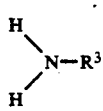

wherein the $R^3$ radical is a hydrogen atom, or a hydrocarbyl, organosilyl or hydrogenoorganosilyl radical. The following are particularly representative:

(i) ammonia ($R^3$=hydrogen atom);

(ii) primary organoamines ($R^3$=alkyl, cycloalkyl, aryl, alkylaryl or arylalkyl ), such as, for example, methylamine, ethylamine, propylamine, butylamine, pentylamine, heptylamine and octylamine, cyclopropylamine, phenylamine, and the like;

(iii) silylamines and more particularly triorganosilylamines, such as (trimethylsilyl)amine and (triethylsilyl)amine, or the hydrogenodiorganosilylamines, such as, for example, (hydrogenodimethylsilyl)amine.

The preferred aminolysis reagents are the primary alkylamines and ammonia.

In a more preferred embodiment of the invention, ammonia is used.

The reaction among the compounds A, B and C to produce the organoboric precursor is designated a co-aminolysis reaction.

The general reaction scheme of this reaction in the reaction medium is as follows:

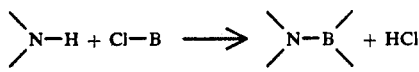

The aminolysis reaction may be carried out in mass or, preferably, in an organic solvent medium (hexane, pentane, toluene, etc.), under anydrous conditions.

The operation is typically carried out under atmospheric pressure, although lower or higher pressures are also within the ambit of this invention.

On the other hand, the aminolysis reactions are characteristically rather exothermic and it is thus preferred to operate at a low temperature.

The duration of the reaction, as a function of the amounts of the reagents introduced, may range from a few minutes to several hours.

The molar ratio in the initial mixture between the compound A and the compound B may vary to a very large degree. In general, it is observed that the higher the percentage of the compound A in the mixture, the higher will be the pyrolytic yield in boron nitride of the precursor produced upon completion of the reaction. In a preferred embodiment of the invention, the molar ratio of compound A/compound B in the initial mixture is at least 1.

At the end of this reaction stage, the precursor is separated from the reaction medium, in particular the ammonium chlorhydrate formed, by any known means, for example by filtration or extraction and decantation by means, in particular, of an ammonia solution.

The precursor, depending upon the operating conditions, may be present at ambient temperature, in the form of a moderately viscous or highly viscous oil to a solid. It is soluble in most of the usual organic solvents (hexane, toluene, and the like), which is highly advantageous relative to possible operations for the shaping thereof.

The precursor recovered in this manner, optionally after the elimination of the solvent and drying, is then subjected to pyrolysis under ammonia at a temperature of from 1,000° to 2,000°, preferably from 1,100° to 1,500° C., such as to produce a ceramic product based on boron nitride according to the present invention.

The ceramic material may assume any one of a number of different forms, all consistent with the requirements of the particular application intended.

In a first embodiment according thereto, the organoboron precursor is simply pyrolyzed in a manner such that the product according to the invention is produced in the form of a powder. This powder, after optional grinding, is then mixed with another silicon ceramic powder, for example a powder of silicon nitride, then sintered until a dense composite of boron nitride/silicon nitride is produced.

In a second such embodiment of the invention, the organoboron precursor is formed prior to the pyrolysis stage.

The precursor may thus be drawn by means of a conventional drawing die (optionally after melting, if the precursor is initially in the solid state), then pyrolyzed such that, ultimately, the product according to the invention is in the form of a boron nitride fiber.

The resulting fibers may then be used, e.g., as reinforcing materials for composites characterized by a silicon ceramic matrix, or of the silicon nitride or other type.

The precursor may also be applied to the surface of a silicon ceramic shape article in the form of a film or coating, such as to provide, after pyrolysis, a silicon ceramic material, such as, for example, silicon nitride, coated with a layer of boron nitride.

In order to further illustrate the present invention and the advantages thereof, the following specific example is given, it being understood that same is intended only as illustrative and in nowise limitative.

EXAMPLE (1) Preparation of an Organometallic Precursor

Into a 5 liter double-jacketed reactor, under nitrogen, 1.7 liter of dry hexane was introduced. The solvent was cooled to $-39°$ C. and 96.6 g $BCl_3$ (0.824 mole) and 111.9 g $Cl_2BN(SiMe_3)_2$ (0.463 mole) were then added thereto. Ammonia was subsequently added (32 moles, while maintaining the reaction temperature at approximately $-20°$ C.). A white precipitate (principally of $NH_4Cl$) was formed instantaneously. Upon completion of the reaction, the reaction mixture was filtered and the white solid washed in hexane. The concentration of the filtrate enabled recovery of 63.2 g of a white product which constituted the desired precursor.

The isolated yield of the co-ammonolysis reaction was 55.6%.

The characteristics of the resulting product were as follows:

$\overline{Mn}$=1,500 (number average molecular weight)
$\overline{Mw}$=3,200 (weight average molecular weight)
Pr=120° C. (softening point)
Weight ratio Si/B=2 (determined by elemental analysis)
TGA (under argon at 800° C.)=41.1%.

(2) Pyrolysis of the Precursor

The pyrolysis of 2.3639 g of the precursor was carried out under the following conditions:

(i) $NH_3$ flushing,
(ii) temperature of from 60° to 400° C.: rate of increase in temperature was 3° C. min$^{-1}$,
(iii) 30 min retention at 400° C.,
(iv) temperature of from 400° C. to 1,100° C.: rate of increase in temperature was 10° C. min$^{-1}$,
(iv) 3 h retention at 1,100° C.

A white product, in a pyrolysis yield by weight of 30.5% (0.7208 g), was then obtained.

The following analyses enabled determination of the exact nature of the ceramic final product:

(a) Infra-red analysis (KBr)

The characteristic bands of boron nitride (BN) were observed at 1,375 cm$^{-1}$ and 815 cm$^{-1}$.

(b) Raman analysis

The characteristic bands of BN were again observed at 1,370–1,380 cm$^{-1}$.

(c) X-ray diffraction analysis

This indicated that the boron nitride was present in the hexagonal crystalline form (according to ASTM 34421).

(d) ESCA analysis

The analysis evidenced, on the surface of the product (to a depth of 200 Å), in the presence of $Si_2N_2O$ and trace amounts of $B_2O_3$; the molar percentage of silicon in this external layer was 27%. Analysis of the core evidenced an overwhelming presence of boron nitride; the molar percentage of silicon was no more than 2%.

The nature of the compounds was determined by resolution of the spectra, after standardization with BN, $B_2O_3$ and $Si_2N_2O$ references.

(e) Average elemental analysis

This analysis evidenced that the molar chemical composition of the ceramic was the following:

| | |
|---|---|
| BN | ≧95% |
| $Si_2N_2O$ | ≦3% |
| $B_2O_3$ | ≦0.5% |
| C | ≦0.5% |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a composite ceramic material which comprises a boron nitride matrix and a compatible amount of a silicon component, said ceramic material comprising a core volume having an external sheath layer on an outer face surface thereof, and the majority of said silicon components being distributed throughout said external layer, which comprises pyrolyzing a preceramic precursor under ammonia at a temperature of 1,000° to 2,000° C., said precursor comprising the product of reaction between (a) admixture of a trihalogenoborane A and at least one dihalogenated boron compound B having the following general formula (I):

wherein X is a halogen, and $R^1$ and $R^2$, which may be identical or different, are each a silyl radical, with (b) an amino compound C which comprises at least one —$NH_2$ group.

2. The process as defined by claim 1, said reaction comprising a mass polymerization.

3. The process as defined by claim 1, said reaction being carried out in an anhydrous solvent medium.

4. The process as defined by claim 1, wherein said compound A comprises trichloroborane.

5. The process as defined by claim 1, wherein said compound B, X is chloro.

6. The process as defined by claim 1, wherein said compound B, $R^1$ and $R^2$ are (trialkyl)silyl radicals.

7. The process as defined by claim 6, wherein $R^1$ and $R^2$ are (trimethyl)silyl radicals.

8. The process as defined by claim 1, wherein said compound C has the following general formula (II):

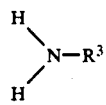

wherein $R^3$ is a hydrogen atom, or an alkyl, cycloalkyl, aryl, alkylaryl, arylalkyl, alkenyl, alkynyl, organosilyl or hydrogenoorganosilyl radical.

9. The process as defined by claim 8, wherein $R^3$ is a hydrogen atom or an alkyl radical.

10. The process as defined by claim 9, wherein $R^3$ is a hydrogen atom.

11. The process as defined by claim 1, wherein said preceramic precursor is a shaped article.

12. The process as defined by claim 11, wherein said preceramic precursor is in fibrous form.

13. The process as defined by claim 11, wherein said shaped article comprises a coated support.

* * * * *